UNITED STATES PATENT OFFICE.

ROBERT A. FISHER, OF PHILADELPHIA, PENNSYLVANIA.

SIZING MATERIAL TO BE USED IN THE MANUFACTURE OF PAPER.

SPECIFICATION forming part of Letters Patent No. 321,096, dated June 30, 1885.

Application filed February 1º, 1885. (Specimens.)

*To all whom it may concern:*

Be it known that I, ROBERT A. FISHER, of the city and county of Philadelphia, State of Pennsylvania, have invented a new and useful Improvement in Sizing Materials used in the Manufacture of Paper, of which the following is a full, clear, and exact description.

Among other materials used in sizing paper is porous alum. This substance is sulphate of alumina, made porous by the action of carbonic acid. The original porous alum patented by Henry Pemberton, No. 82,747, was made by dissolving pure hydrated alumina, (made from the mineral cryolite,) in dilute sulphuric acid, and adding to the hot solution of sulphate of alumina thus produced (free from iron) an alkaline carbonate or the carbonate of an alkaline earth. In this process carbonic acid is at once copiously evolved, and the result is sulphate of alumina in a porous or reticular condition, free from iron, and consequently colorless. The patent issued to Carl V. Petraeus, No. 269,957, is for the process of manufacturing a "porous zinciferous alum," by subjecting "sulphate of alumina, molten in its water of crystallization, to the action of carbonate of zinc." If the sulphate of alumina employed in this process be made from pure hydrate of alumina, the result is a white porous mass, being a mixture of sulphate of alumina and sulphate of zinc; but if the sulphate of alumina be prepared from an aluminous compound containing ferric oxide, (the mineral bauxite, for instance,) the resulting porous zinciferous alum has an objectionable buff or brown color.

My invention consists in the production directly from bauxite or any other aluminous substance containing ferric oxide a sizing material for paper-makers' use, in a porous or reticular condition, which contains both zinc and iron, but which is entirely free from the objectionable buff color always imparted by ferric oxide, though the amount of that material present be less than one per cent.

The following is a method of carrying out my invention:

In a capacious lead-lined vessel containing sulphuric acid of density 50° Baumé, (more or less,) heated to the temperature of 190° Baumé, (more or less,) I introduce a proper quantity of finely-ground bauxite or other ferruginous alum-clay. The relative quantities of sulphuric acid and bauxite required will depend upon the density of the acid and the percentage of alumina contained in the alum-clay. It may be stated in general terms that one hundred pounds of sulphuric acid of 50° Baumé will be required for forty to fifty pounds of bauxite. Soon after the finely-ground bauxite has been put into the acid violent chemical action will set in, and water must be added from time to time to prevent an overflow. When the chemical action has nearly ceased, enough water is added to reduce the density of the liquid to 26° Baumé, more or less. The liquid is then drawn off into settling-tanks, where it remains until the silica and other insoluble matter has subsided. The clear liquid is then decanted and treated with metallic zinc. A convenient method is to place scrap-zinc or "feathered" spelter in strong shallow wicker baskets submerged at the top of the liquid. If the liquid be heated chemical action upon the zinc will begin almost immediately; if cold, not until some time afterward. The chemical action is accompanied by evolution of hydrogen gas, and the iron existing in the solution as ferric oxide ($Fe_2O_3$) will in no time be reduced to ferrous oxide, (FeO.) When this has occurred, the solution should be concentrated to a density of 65° Baumé, (more or less,) and allowed to cool until it becomes viscid, when (2) two per cent., (more or less,) of bicarbonate of soda should be stirred into the mass. While still soft or semifluid, the mass is poured upon a stone or other suitable floor, and when cold crushed into lumps of the desired size.

I do not confine myself to the use of bicarbonate of soda, as the bicarbonate or carbonate of any alkali or any alkaline earth, or of any other carbonate that will evolve carbonic acid by contact with hot sulphate of alumina in a viscid condition, will produce the desired porosity; but I prefer bicarbonate of soda.

I am aware that Francis Laur, of France, has introduced pieces of zinc into solutions of sulphate of alumina containing ferric oxide to "produce an aluminous compound for paper-makers' use in cake or ground form, containing sulphate of zinc;" but the production of a merchantable article by this means requires a long and expensive process, involving air-drying for several days, much handling, crushing by machinery, and, finally, drying by artificial heat.

My invention does away with these several operations, and I produce within an hour after the solution has been evaporated to the proper density a superior merchantable article at a much reduced cost.

I have found that the hyposulphite of soda, sulphurous acid, and other so-called "reducing agents" will convert the ferric oxide into ferrous oxide, and thus decolorize the solution of sulphite of alumina, and these may be used without departing from the spirit of my invention; but I prefer to use zinc.

Having thus explained my invention, what I claim as new, and desire to secure by Letters Patent, is—

1. The process described of manufacturing a white porous material for paper-makers' use containing sulphate of alumina, sulphate of zinc, and ferrous sulphate, substantially as herein set forth.

2. The process herein described of producing directly from any aluminous substance containing ferric oxide a white sizing material for paper-makers' use which contains both zinc and iron, substantially as herein set forth.

3. The process herein described of producing directly from any aluminous substance containing ferric oxide a white sizing material for paper-makers' use, consisting, essentially, in first heating sulphuric acid, and mixing into it any ferruginous alum-clay, adding water from time to time to prevent overflow, next drawing off the liquid into settling-tanks and decanting the clear liquid, then treating the liquid with metallic zinc and adding bicarbonate of soda, and, finally, cooling the mass and crushing into lumps of desired size.

ROBERT A. FISHER.

Witnesses:
H. B. APPLEWHAITE,
DANIEL CLARK.